March 13, 1962  R. G. NILL ETAL  3,025,008
STATOR WINDING MACHINE
Filed April 17, 1959  8 Sheets-Sheet 1

Inventors:
Richard G. Nill,
Robert J. Eminger,
by Gust & Disk
Attorneys.

March 13, 1962 R. G. NILL ETAL 3,025,008
STATOR WINDING MACHINE
Filed April 17, 1959 8 Sheets-Sheet 2

Inventors:
Richard G. Nill,
Robert J. Eminger,
by Gust & Diok
Attorneys.

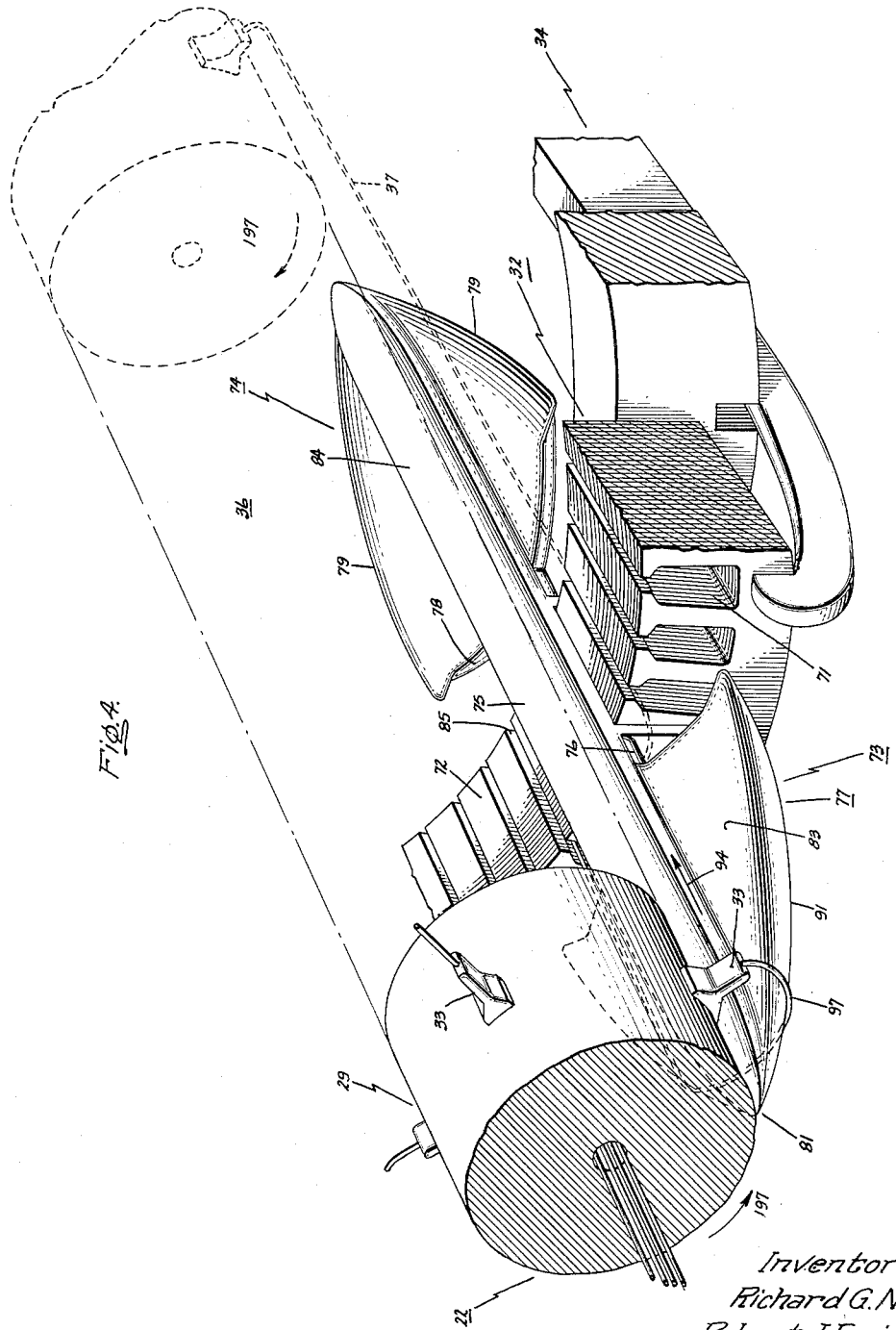

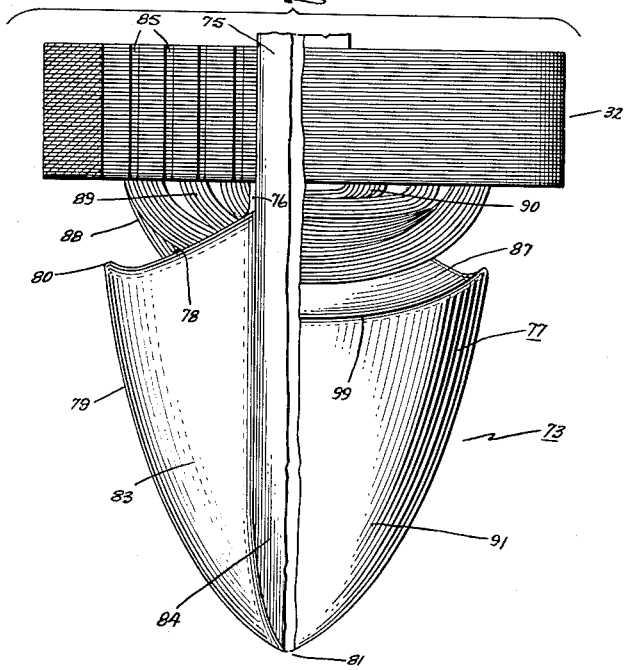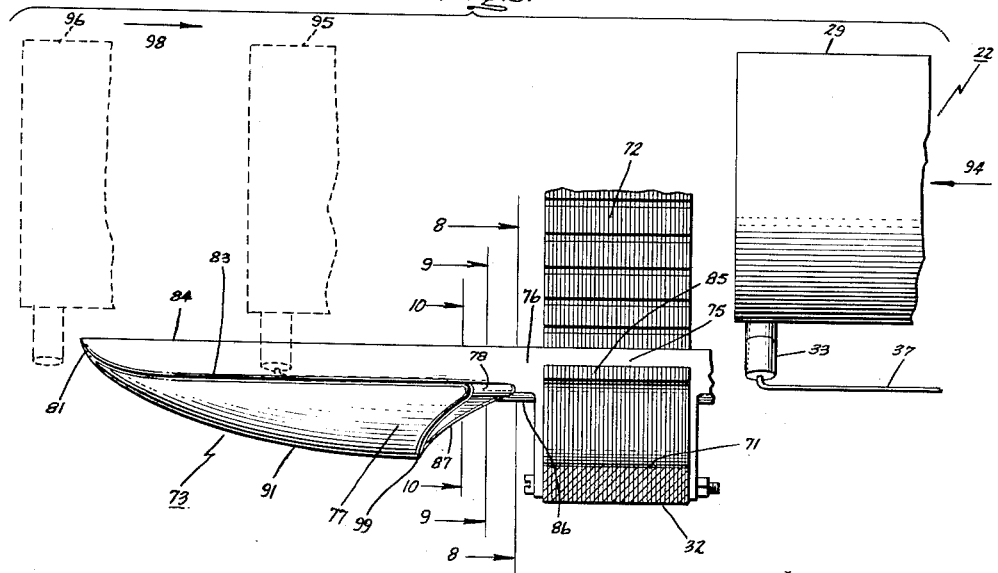

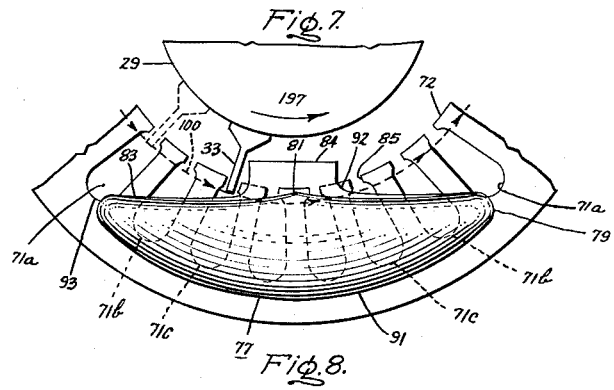
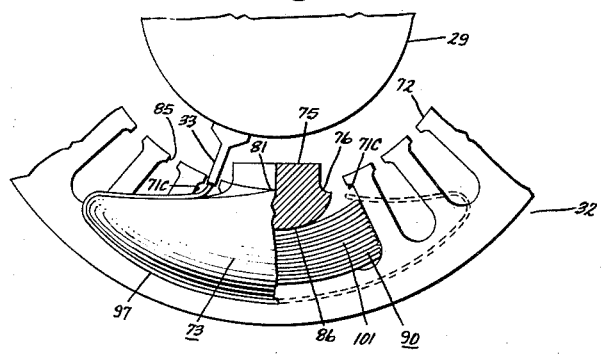
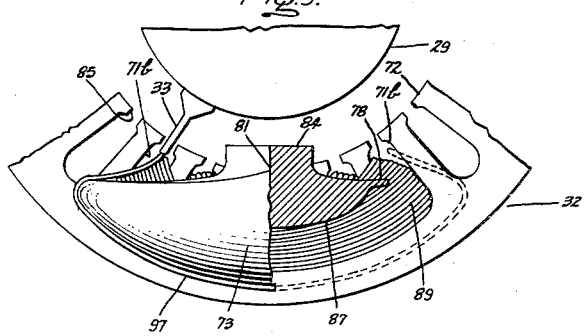
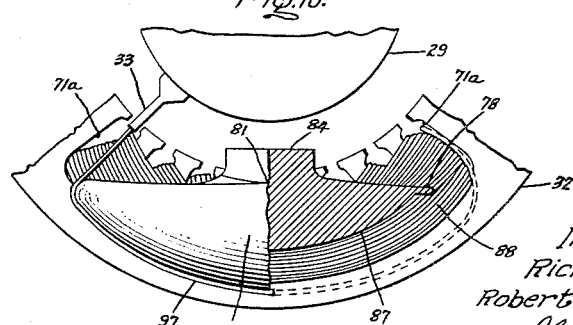

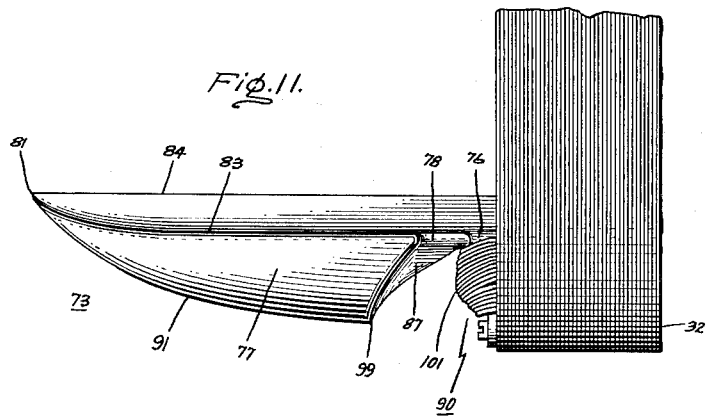
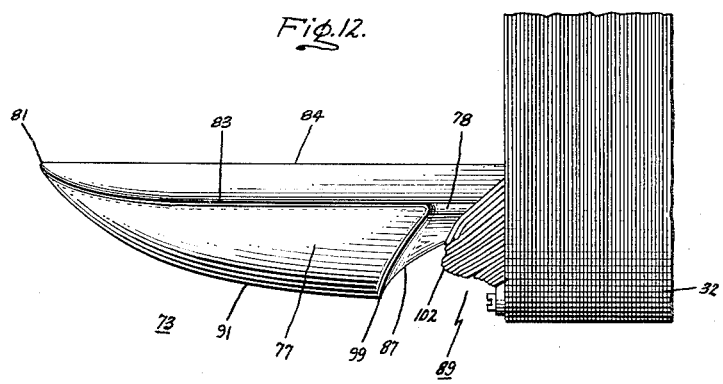
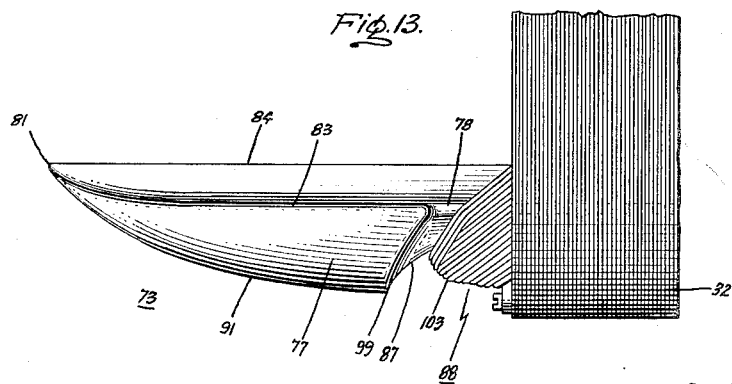

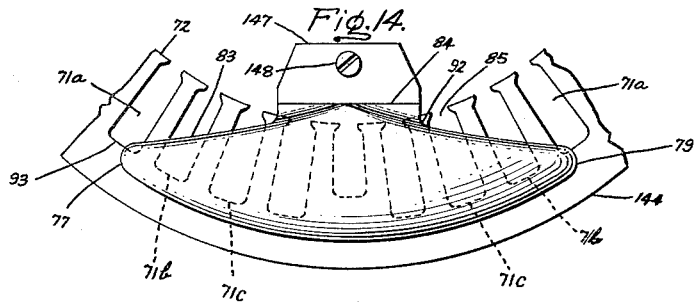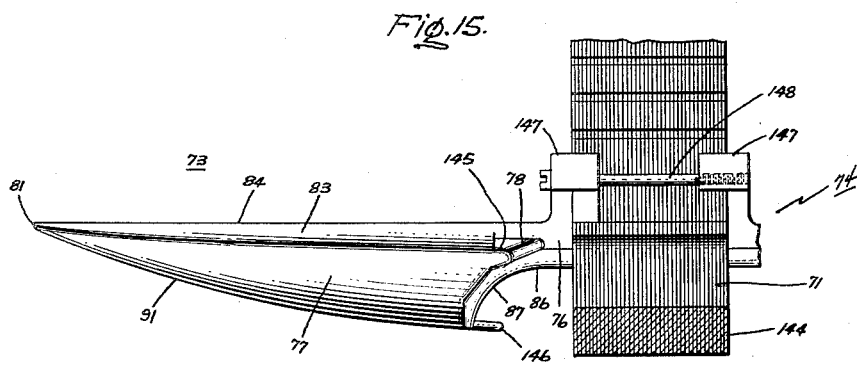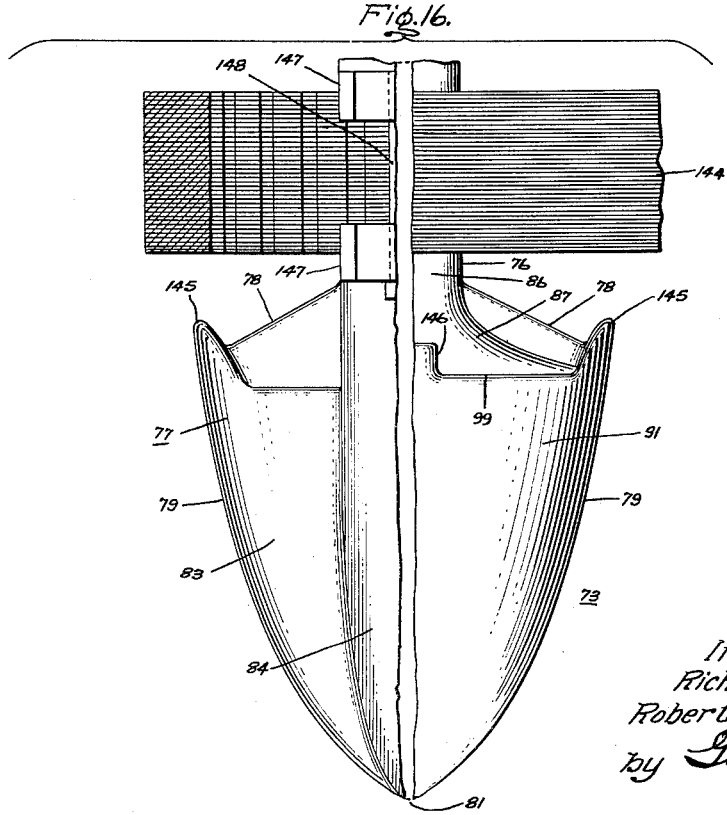

March 13, 1962 R. G. NILL ET AL 3,025,008
STATOR WINDING MACHINE
Filed April 17, 1959 8 Sheets-Sheet 8

Inventors:
Richard G. Nill,
Robert J. Eminger,
by Just & Trish
Attorneys.

3,025,008
STATOR WINDING MACHINE
Richard G. Nill, Fort Wayne, and Robert J. Eminger, Kendallville, Ind., assignors, by mesne assignments, to Fort Wayne Tool & Die Inc., Fort Wayne, Ind., a corporation of Indiana
Filed Apr. 17, 1959, Ser. No. 807,190
13 Claims. (Cl. 242—1.1)

This invention relates generally to machines for winding coils on dynamoelectric machine stator core members, and more particularly to a gun-type stator winding machine for winding a plurality of concentric coils of different pitch into multi-slot, internally slotted stators.

Gun-type stator winding machines are well known in the art, conventionally comprising a winding head having a wire dispensing needle or gun on its outer surface, the head being reciprocally moved through the bore of the stator to be wound and also having limited rotational movement imparted thereto adjacent the ends of its stroke. Movement of the head with its wire dispensing needle through the stator bore in one direction thus carries a wire therethrough to form one side of the coil with the rotational movement of the head at the end of this stroke forming one end turn; the next axial motion of the head in the opposite direction back through the bore forms the other side of the coil and finally the next rotational movement of the head restoring the wire dispensing needle to its original position forms the other end turn thus completing one turn of the coil being wound. Numerous arrangements, such as various hooks and "shroud" members, have been employed in gun-type winding machines in order properly to form the end turns. The end turn-forming members or "shrouds" commonly employed in such machines have conventionally comprised a pair of parts respectively arranged abutting the ends of the stator core member being wound and extending axially outwardly therefrom, each such end turn-forming part having a width corresponding to the pitch of the coil being wound. Thus, with such prior gun-type stator winding machines and end turn-forming shrouds known to the present applicants, the wire dispensing needle on the winding head moved outwardly from the bore of the stator core member carrying the wire over a side of the respective shroud member part with rotation of the winding head at the end of its stroke thus causing the wire to form a loop around the respective shroud member part; subsequent axial movement of the winding head and the wire dispensing needle back through the stator bore thus pulled the wire loop along the outer surface of the respective shroud member part so that it ultimately formed an end turn at the respective end of the stator member. The path of the winding head is thus sequentially parallel and transverse to the axis of the stator bore.

Gun-type winding machines are in many respects superior to other known types of stator winding machines by virtue of the fact that a plurality of angularly spaced wire dispensing needles may be provided around the periphery of the winding head thus permitting simultaneous winding of a corresponding number of coils. The use of gun-type winding machines has, however, in the past been generally limited to the winding of stator members for salient pole-type machines, such as shaded pole and series motors. This has primarily been due to the fact that stators of the distributed-winding type conventionally comprise a plurality of pole-groups of concentrically arranged coils, each coil in a given coil group having a different pitch. In order therefore to wind the coils of a distributed winding, it has in the past been necessary to employ a different width shroud member for each pitch coil and further to adjust the rotational movement of the winding head each time a coil of a different pitch was to be wound. For these reasons, gun-type stator winding machines have not in the past been generally considered suitable for use in winding distributed-type windings and other types of winding machines have therefore been employed for winding such stators; such machines have generally wound or placed only one group of coils at a time, it being necessary to index the stator in order to wind the coils of each successive pole-group. It is therefore desirable to provide a gun-type stator winding machine for winding a plurality of concentric coils respectively having different pitches which does not require the use of different shroud members for the coils of each different pitch, and further which does not require manual adjustment of the rotational movement of the winding head for each different pitch coil. Such a winding machine would therefore eminently be suited for winding distributed winding-type stators by virtue of the fact that all the coils having the same pitch of all of the coil groups of the stator can be simultaneously wound, thus obviating the necessity for providing means for indexing the stator.

It is therefore an object of our invention to provide an improved gun-type stator winding machine for winding a plurality of concentric coils of different pitch.

Another object of our invention is to provide an improved gun-type stator winding machine for winding at least two concentric coils of different pitch which employs the same shroud member for winding both coils.

A further object of our invention is to provide an improved gun-type stator winding machine for winding at least two concentric coils of different pitch with means for automatically shifting the rotational movement of the winding head from that corresponding to the pitch of one coil being wound to that corresponding to the pitch of the next coil to be wound.

A still furthre object of our invention is the provision of an improved shroud member for a stator winding machine with which a plurality of concentric coils of different pitch may be wound.

Further objects and advantages of our invention will become apparent by reference to the following description and accompanying drawings, and the features of novelty which characterize my invention will be pointed out with particularity in the claims annexed to and forming a part thereof.

Our invention, in its broader aspects, provides a gun-type stator winding machine for winding at least two concentric coils of different pitch in a dynamoelectric machine stator core member, the winding machine having wire dispensing means with means for reciprocally moving the same through the bore of the stator core member and means for imparting at least two predetermined rotational movements to the wire dispensing means corresponding respectively to the pitch of the two coils to be wound. In accordance with our invention, we provide a shroud member adapted to be secured to the stator core member to be wound and having a pair of end turn-forming parts respectively extending axially outward on each side thereof, each of the parts having a first portion narrower than the pitch of the smallest of the coils to be wound and a second portion having a width generally corresponding with the pitch of the larger of the coils to be wound. In the preferred embodiment of our invention, each of the end turn-forming parts has a shank portion adjacent the stator core member and an enlarged portion having its inner end joined to the shank portion; the shank portion has a width less than the pitch of the smallest of the coils to be wound and the enlarged portion has a width adjacent its inner end corresponding to the pitch of the larger of the coils to be wound with its sides merging generally to a point at its outer end and with the edges of its inner end tapering outwardly and forwardly from the shank portion with their ends respectively being joined to the ends of the sides of the enlarged portion.

In the drawings:

FIG. 4 is a fragmentary view in perspective illustrating the general form of our improved shroud member and the cooperation of the winding gun therewith to wind the coils in the stator member slots;

FIG. 5 is a vertically divided view, the left hand side of which shows the inner or bore side of one form of our improved shroud member and the right hand side of which shows the outer side of the same shroud member, the two sides respectively showing a completed group of concentric coils;

FIG. 6 is a fragmentary side view further showing the improved shroud member of FIG. 5;

FIG. 7 is a fragmentary end view showing the configuration of the shroud member of FIGS. 5 and 6 and its relationship to a stator core member and the winding gun;

Figure 17:
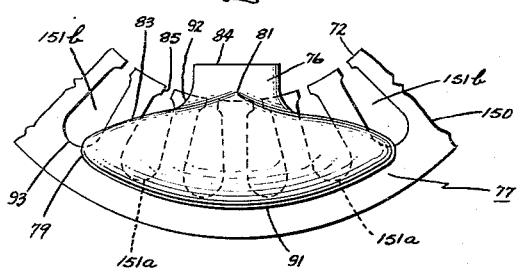
Figure 18:
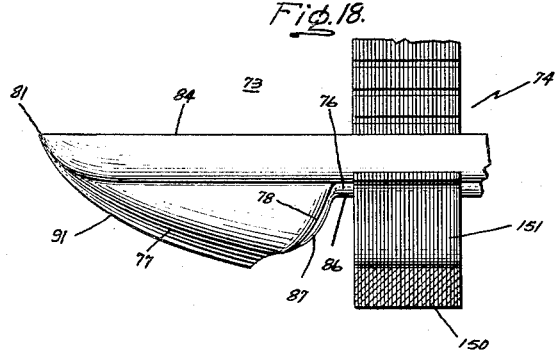

FIGS. 8, 9 and 10 are fragmentary vertically divided views, the left hand sides of which are front views of the shroud member of FIGS. 5, 6 and 7 showing the action of the winding gun in forming each of three concentric coils, and the right hand sides of which are cross-sectional views taken along the lines 8, 9 and 10 respectively of FIG. 6, further showing the relationship of the three concentric coils of one winding group with our improved shroud member;

FIGS. 11, 12 and 13 are fragmentary side views of the improved shroud member of the previous figures successively showing the formation of three concentric coils of one winding group thereon;

FIG. 14 is an end view of a slightly different form of shroud member in accordance with our invention;

FIG. 15 is a fragmentary side view of the shroud member of FIG. 14;

FIG. 16 is a vertically divided view of the shroud member of FIGS. 14 and 15, the left hand side of which shows the bore side of the shroud member and the right hand side of which shows the outer side thereof;

FIG. 17 is a fragmentary front view of yet another shroud member in accordance with my invention adapted for winding two concentric coils;

FIG. 18 is a fragmentary side view of the shroud member of FIG. 17; and

Figure 19:
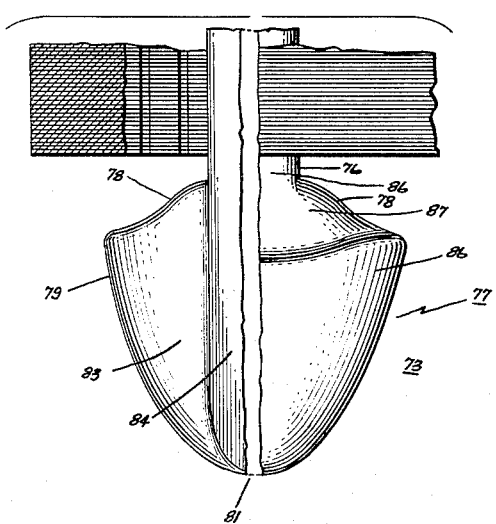

FIG. 19 is a fragmentary vertically divided view of the shroud member of FIGS. 17 and 18, the left hand side of which shows the bore side of the shroud member and the right hand side of which shows the outer side thereof.

Figure 1:
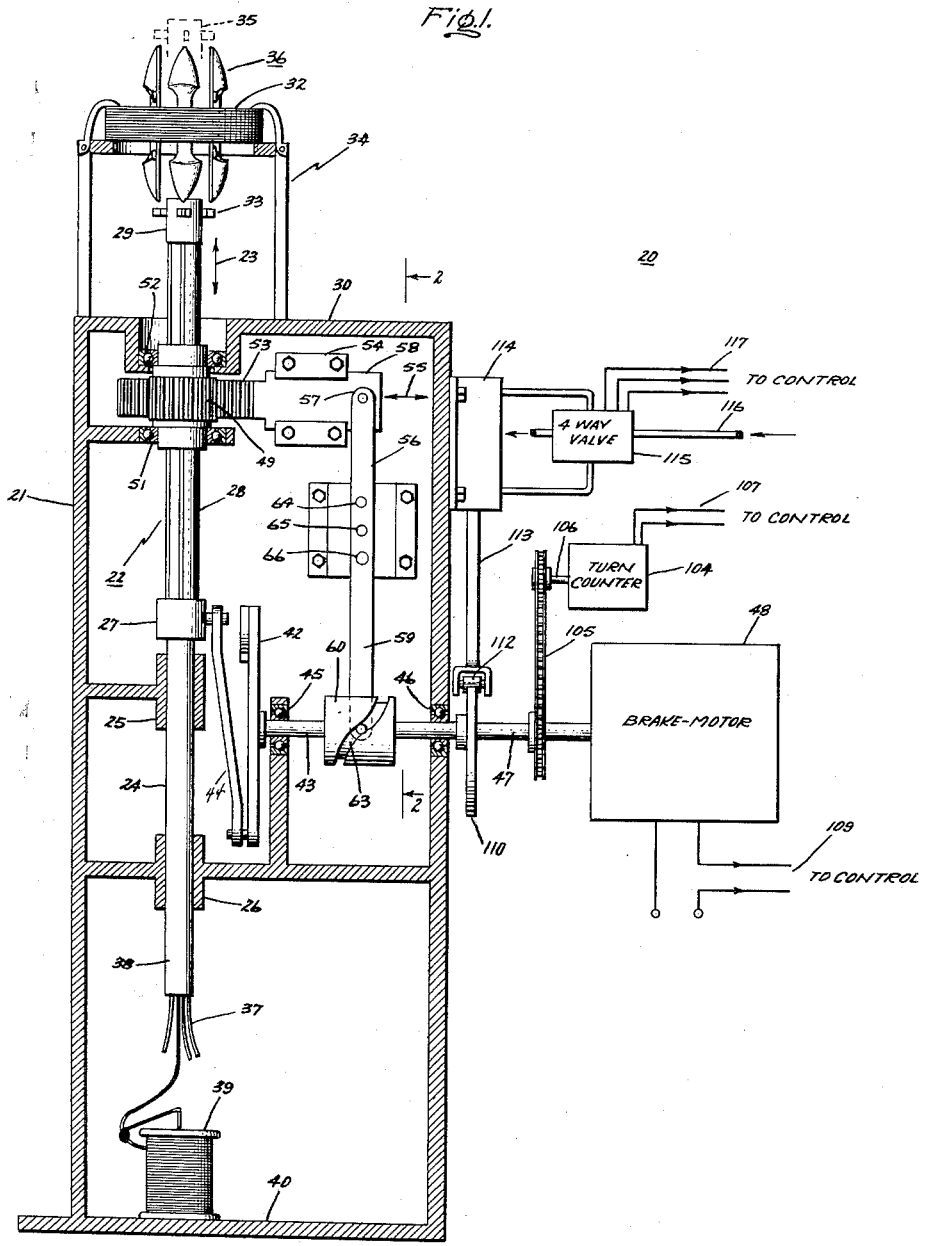
FIG. 1 is a side elevational view, partly in cross-section illustrating our improved stator winding machine.
Figure 2:
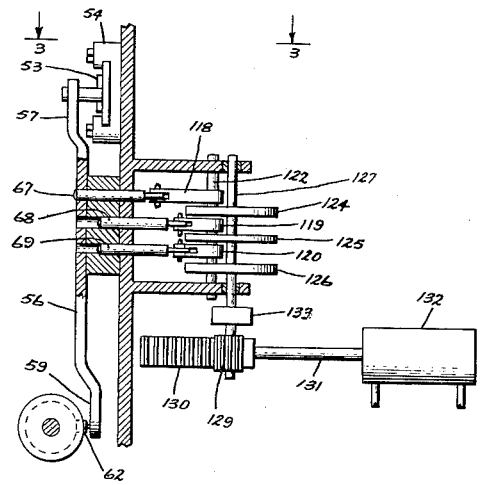
FIG. 2 is a fragmentary cross-sectional view taken along the line 2—2 of FIG. 1.
Figure 3:
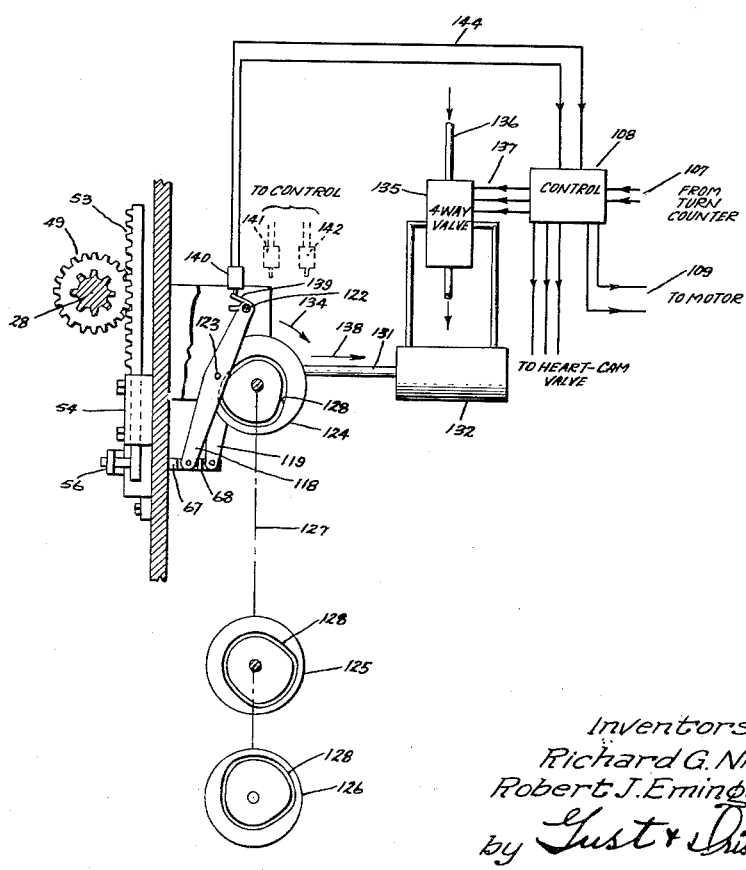
FIG. 3 is another fragmentary view taken along the line 3—3 of FIG. 2.

Referring now to FIGS. 1, 2 and 3 of the drawing, our improved gun-type stator winding machine, generally identified as 20 includes a frame assembly 21 having a winding head assembly 22 carried thereby for reciprocal movement axially in the direction of the arrow 23. More particularly, the winding head assembly 22 includes an elongated hollow portion 24 supported in bearing elements 25 and 26 on frame 21. A hub portion 27 is formed at the upper end of winding head portion 24 and extending upwardly therefrom is a splined portion 28 terminating in a wire dispensing needle carrying portion 29 which projects beyond the upper surface 30 of frame 21.

In the illustrated embodiment, winding machine 20 is adapted for simultaneously winding a four-pole stator core member 32 with each pole comprising three concentric coils. Winding head 22 thus is provided with four wire dispensing needles 33 extending radially outwardly from the needle carrying portion 29 and angularly displaced respectively by 90° (ninety degrees) (only three needles 33 are shown in FIG. 1). Core 32 is supported in spaced-apart relationship from the upper surface 30 of frame 21 by means of a supporting assembly 34 and it is thus seen that the end portion 29 and the wire dispensing needle 33 of winding head 22 are adapted to be reciprocally moved through the bore of the stator core member 32 from the position shown in solid lines of FIG. 1 to the position shown in dotted lines 35. Four of the improved shroud members 36 of our invention are positioned on the stator core member 32 as will be hereinafter more fully described. Winding head assembly 22 is hollow so that the four wires 37 from which the coils forming the winding of stator core member 32 will be formed can extend therethrough from the lower end 38 to and out of the wire dispensing needles 33. Wire spools 39 (only one of which is shown) may be accommodated on the bottom surface 40 of frame 21 with wires 37 being drawn therefrom into the hollow winding gun assembly 22, as is well known in the art.

The axial reciprocal motion of winding head assembly 22 is provided by means of a suitable crank 42 mounted on drive shaft 43 and rotatable therewith, crank 42 being operably connected to hub 27 of winding gun assembly 22 by means of a suitable crank arm 44, as shown. Shaft 43 is rotatably supported by suitable bearings 45 and 46 in frame 21 and has a portion 47 extending out of the frame 21 and operably connected to a suitable brake-motor 48. It will now be seen that when brake-motor 48 is energized from a suitable source of power so as to drive shaft 43, crank 42 will rotate thus to actuate crank arm 44 and to impart axial reciprocal motion to the winding head 22 in the directions shown by the arrows 23, thus in turn to move the wire dispensing needles 33 through the bore of stator core member 32.

In order to impart the requisite limited rotational movement to the winding head assembly 22, a suitable gear 49 is provided having a splined connection with the splined portion 28 of the winding gun assembly 22, as best seen in FIG. 3. Gear 49 is rotatably supported by means of suitable bearings 51 and 52 supported by frame 21, as shown. It will now be readily understood that the winding head assembly 22 is free to move axially with respect to gear 49 by virtue of the splined connection between gear 49 and splined portion 28 of winding head assembly 22, however, that rotation of the gear 49 will likewise impart rotational movement to the winding gun assembly 22. Rotation is imparted to gear 49 and in turn to winding head assembly 22 by means of a suitable rack 53 engaging gear 49 and being slidably mounted on frame 21 by means of a suitable bearing assembly 54. The rack 53 is reciprocally moved in the direction shown by the arrows 55, i.e., transversely to the direction of reciprocal movement of the winding head assembly 22, by means of a pivoted lever member 56 having one end 57 pivotally connected to end 58 of rack 53 and having its other end 59 actuated by a suitable cylindrical or "barrel" cam 60 mounted on shaft 43; it will be seen that end 59 of the pivoted lever member 56 has a suitable cam follower roller 62 secured thereto which cooperatively engages groove 63 in the barrel cam 60.

As will be hereinafter more fully described, pivoted lever member 56 is provided with three pivot-forming openings 64, 65 and 66 respectively cooperating with three pivot pins 67, 68 and 69. Assuming now that the pivot pin 67 is seated in the opening 64 in lever member 56 with the other pivot pins 68 and 69 being withdrawn from their respective openings 65 and 66 (as best seen in FIG. 2), it will be seen that rotation of shaft 43 will provide a corresponding rotation of the barrel cam 60 and thus pivotal motion of lever member 56 under the influence of the slot 63 in the barrel cam 60 thereby to impart reciprocable motion to the rack 53 in the direction shown by the arrow 55 and in turn to rotate gear 49 and head assembly 22. It will further be seen that with the pivot pin 67 seated in opening 64, the end 57 of the lever member 56 has its shortest stroke thereby imparting the smallest rotational motion to the gear 49 and the gun assembly 22. Likewise, with pin 69 seated in opening 66 in lever member 56 (and with the other pins 67 and 68 withdrawn) rotation of shaft 43 and barrel cam 60 imparts the greatest stroke to the end 67 of lever 56 thus in turn imparting the greatest rotational movement to the gear 49 and gun assembly 22. As will further hereinafter more fully be described, the three pivot pin openings 64, 65, 66 in lever member 56 and their respectively cooperating pivot pins 67, 68 and 69 provide rotational movements for gun assembly 22 respectively corresponding to the pitches of the three concentric coils to be wound in each pole group on the stator core member 32. It will be understood that cam slot 63 in barrel cam 60 is arranged to move rack 53 in one direction, for example to the left, during the interval that crank 42 and crank arm 44 have moved winding gun assembly 22 to one extreme end of its stroke, for example that shown in solid lines in FIG. 1, and conversely, to move rack 53 in the other direction, i.e., for example to the right, when winding gun assembly 22 is at the other extreme end of its stroke, i.e., as shown in dashed lines 35 in FIG. 1.

Referring now additionally to FIGS. 4 through 7, inclusive, the general configuration of my improved shroud member 36 and its cooperation with the stator core member 32 and winding head 22 will be explained. Stator core member 32 is conventionally formed of a stacked plurality of relatively thin laminations of magnetic material and has a plurality of radially outwardly extending winding slots 71 formed therein communicating with bore 72; a plurality of concentrically disposed windings, such as those employed in a conventional split-phase induction motor, are ultimately to be wound in the winding slots 71. As best seen in FIG. 4, each of my improved shroud members 36 comprises two end turn-forming parts 73 and 74 respectively extending axially outward from each side of stator core member 32; only one shroud member 36 is shown in FIG. 4 whereas it will be understood that one such shroud member is provided for each pole group to be wound, i.e., in a four pole motor four such shroud members will be provided. The end turn-forming parts 73 and 74 are shown in FIG. 4 as being integrally joined by a portion 75 extending through the bore 72 of the stator core member 32, however, as will be seen in connection with other figures of the drawing, it may be found more convenient to make the parts 73 and 74 separable with means being provided respectively for clamping them to the core. Each of the end turn-forming parts 73, 74 comprise a shank portion 76 adjacent stator core member 32 and in the embodiment of FIGS. 4 through 7 being integrally joined to the connecting portion 75, and an enlarged portion 77 having its inner end integrally joined to shank portion 76. As best seen in FIG. 5, the edges 78 of the inner end of end turn-forming parts 73, 74 taper outwardly and forwardly from shank portion 76 and the side edges 79 merge smoothly from their junctions 80 with the tapered edges 78 to a substantial point 81 at the outer end of the end turn-forming parts 73, 74 remote from a stator core member 32.

It will be seen that the connecting portion 75 in the embodiment of FIGS. 4 through 7 extends axially outwardly over the inner surfaces 83 of the end turn-forming parts 73, 74, in the nature of a rib 84, to the point 81. It will further be seen that the wire dispensing needle 33 of the winding head 22 extends into the neck portions 85 of the winding slots 71 and as best seen in FIG. 6, that the inner or bore-side surfaces 83 of the end turn-forming parts 73, 74 on either side of rib 84 spaced radially outwardly from the path of travel of the wire dispensing needle 33. The outer surface 91 of the enlarged portion 77 of the end turn-forming parts 73, 74, i.e., remote from the bore-side surfaces 83, is transversely outwardly curved, merging smoothly to point 81; as shown, the enlarged portion 77 presents a somewhat "bulbous" appearance.

The outer surface 86 of the shank portion 76 is also transversely outwardly curved, as best seen in FIG. 8, and the area 87 of the outer surface of each end turn-forming part 73, 74 intermediate the enlarged portion 77 and shank portion is also transversely outwardly curved, merging smoothly to join the transversely curved surface 86 of shank portion 76.

Referring now to FIGS. 5 and 7 particularly, each pole group of concentric coils to be wound on stator core member 32 is, in the instant embodiment, formed of three concentric coils 88, 89 and 90; it will be observed that the outer coil 88 has its sides respectively positioned in slots 71a, the intermediate coil 89 has its sides respectively positioned in slots 71b and the inner coil 90 has its sides respectively positioned in slots 71c. It will also be observed that the transverse width of the enlarged portions 77 at their widest point, i.e., between the junctions 80 of the tapered edges 78 and the side edges 79, generally corresponds to the span or pitch of the largest coil 88 to be wound, i.e., extending between slots 71a. It will further be observed that the transverse width of the shank portion 76 and likewise the connecting portion 75 and rib portion 84 is less than the span or pitch of the smallest coil 90 to be wound, i.e., narrower than the span between slots 71c. Referring now particularly to FIG. 7, it will additionally be observed that the inner edges 92 of the inner surfaces 83 of the enlarged portions 77 are in general axial alignment with the neck portions 85 of the innerslots 71c in which the smallest coil 90 is to be wound, whereas the side edges 79 are in general axial alignment with the bottoms 93 of the outer slots 71a in which the largest coil 88 is to be wound. It is thus seen that the inner surfaces 83 of enlarged portions 77 taper outwardly with reference to bore 72 of stator core 32 from the rib 84 to the side edges 79.

Referring now particularly to FIGS. 4, 6 and 7, it will be seen that as the winding head 22 moves axially into and through the bore 72 of stator core member 32 in the direction shown by the arrow 94, needle 33 follows a path through a respective slot opening or neck portion 85 of a winding slot 71, for example slot opening 85 of one of the inner pair of slots 71c with wire 37 dispensed from wire dispensing needle 33 being carried through the respective slot opening. Subsequent movement of the winding head 22 out of the bore 72 of stator core member 32 toward point 81 carries the wire 37 over the respective inner surface 83 of enlarged portion 77, as shown in dashed lines 95 in FIG. 6. When the winding head 22 reaches one extreme end of its stroke, as shown in dashed lines 96, wire dispensing needle 33 is beyond point 81 of the respective end turn-forming parts 73, 74 and at this point, the winding head 22 is rotated, as shown by the arrow 197. It will here be observed that point 81 of the end turn-forming parts 73, 74 respectively is spaced radially inward from the inner surfaces 83 of the enlarged portion 77 and thus from the path traversed by the outer end of wire dispensing needle 33 when the same is rotated in the direction 197, as shown by dashed lines 100 in FIG. 7. Thus, when the winding head 22 is rotated from a first predetermined position in which the wire dispensing needle 33 axially traversed one slot of a pair of slots in which a coil is to be wound, e.g., one slot 71c to a second predetermined position in which needle 33 will pass axially through the other slot in which one coil is to be wound, e.g., the other slot 71c, the wire 37 being dispensed from needle 33 forms a transverse loop 97 around the curved outer surface 91 of the enlarged portion 77 of the respective end turn-forming parts 73, 74. Reference to FIG. 7 will further reveal that the radial outward extent of the curved outer surface 91 of the enlarged portion 77 is radially greater than the radial extent of the winding slots 71. Continued axial movement of the winding head 22 in the opposite direction, i.e., that shown by arrow 98, carries loop 97 along the curved surface 91 of the respective enlarged portion 77 until the loop reaches the inner edge 99 thereof. Subsequent axial movement of wire dispensing needle 33 into the respective winding slot, e.g., the other winding slot 71c, then causes the loop 97 to follow the intermediate area 87 and finally to form an end turn under the outer surface 86 of the shank portion 76.

Referring now additionally to FIGS. 8 through 13, in winding a group of three concentric coils 88, 89 and 90 forming one pole group of a distributed winding, the rotational movement of the winding head 22 is first arranged, as will be hereinafter more fully described, so that the wire dispensing needle 33 traverses neck portions 85 of the inner slots 71c in which the inner coil 90 is to be wound thus forming end turns 101 under the curved inner surface 86 of shank portion 76, as best seen in FIGS. 8 and 11. It will further be seen that the curved configuration of the outer surface 86 of the shank portion 76 forms or shapes the end turns 101 radially outwardly away from the bore 72 of stator core 32, tending further to force the individual turns toward the bottoms 93 of slots 71c.

When the requisite number of turns has been wound in the slots 71c to form the smallest coil 90, the rotational or transverse movement of the winding head 22 is shifted, in a manner to be hereinafter described, so that the wire dispensing needle 33 now axially traverses slot openings 85 of the slots 71b in which the intermediate-span coil 89 is to be wound. Referring now particularly to FIGS. 5, 9 and 12, it will be observed that the initial end turns 102 of coil 89, i.e., those toward the bottom of slots 71b are disposed over the end turns 101 of the smallest coil 90 and still under the curved outer surface 86 of the shank portion 76. However, as the individual turns forming winding 89 are piled up in the slots 71b, it will be seen that the turns closer to the slot openings 85 begin to engage the tapered edges 78 of the enlarged portion 77 and then are brought under the curved surface 87. Particular reference to FIG. 12 will reveal that the engagement of the tapered edges 78 with the innermost end turns 102 of the coil 89 tends to force the innermost turns and thus the entire coil outwardly toward the bottoms of the slots 71b thus providing greater slot fullness; it will be readily understood that with the winding slots 71 extending radially inwardly, if the end turns tended to define the cord of the arc subtended by the respective winding slots, there would in turn be a tendency for the turns forming the winding to be forced radially inwardly out of the respective slots.

When the requisite number of turns has been wound in the intermediate coil 89, the rotational movement of the winding head 22 is again shifted so that the wire dispensing needle 33 now passes axially through the neck portions 85 of the outermost slots 71a in which the largest coil 88 is positioned. The end turns 103 of this winding first pile up on top of the respective end turns 101 and 102 of the smallest and intermediate coils 90 and 89. Here, it will be observed that a considerably larger number of the individual turns in slots 71a engage the tapered edges 78 of enlarged portion 77 and the end turn-forming parts 73, 74 before passing under the curved portion 87. It will now be seen that the composite effect of the curved outer surface 86 of the shank portion 76, the tapered edges 78 of enlarged portion 77 and the curved outer surface 87 is to form or shape the end turns 101, 102 and 103 away from the bore 72 of the stator core member 32 and also to force the windings 88, 89 and 90 radially outwardly in their respective winding slots 71 thereby permitting the winding of a greater number of turns of wire in the slots and in turn greater slot fullness than has heretofore been possible with conventional gun-type winding machines.

It will now be seen that in order to wind three concentric coils 90, 89 and 88, it is necessary that three different predetermined rotational or transverse movements be successively imparted to the winding head 22 in order that the wire dispensing needle 33 successively axially traverse the pair of slots 71c, 71b and 71a in order successively to wind the three coils 90, 89 and 88. Referring back to FIGS. 1, 2 and 3, it will immediately be perceived that the three pivot pins 67, 68 and 69 which sequentially cooperate with the three pivot pin openings 64, 65 and 66 in the lever member 56 provide the requisite three predetermined rotational movements of winding head 22. In order in turn to provide for automatic shifting successively between the three predetermined rotational movements, the arrangement now to be described is provided. Here, we have provided a conventional turn counting mechanism 104 driven from the drive shaft 47 in any suitable manner, as by a suitable chain drive 105. Turn counter 104 is of the type generally referred to as a "program counter" and is adapted to close internal contacts (not shown) responsive to the counting of a successive predetermined number of rotations of its input shaft 106 which in turn is responsive to the number of turns in the respective coils wound by the winding head 22. Thus, as is well known in the art, turn counter 104 may be preset to close its contacts and to provide a first signal across leads 107 connected thereto responsive to a first predetermined number of turns wound in the inner coil 90, a second signal responsive to a second predetermined number of turns wound in intermediate coil 89, and finally a third signal responsive to a predetermined number of turns wound in the largest coil 88. Leads 107 from the turn counter 104 are connected to a suitable control device 108, which, since it merely comprises conventional relay circuitry well known to those skilled in the art, need not be more fully described here. Control 108 is in turn connected to energize brake motor 48 by means of leads 109.

It is readily apparent that in order to remove a given pivot pin from its corresponding pivot pin opening in lever member 56 and to insert a different pivot pin to provide a different rotational movement for winding head 22, it is necessary that lever member 56 be prepositioned with each of the pivot pin openings 64, 65 and 66 in alignment with a respective pivot pin 67, 68 and 69. In order to provide this prepositioning of lever member 56, we provide a heart-shaped cam 110 mounted on shaft 47 engaged by a suitable roller 112 mounted on a push rod 113 actuated by a suitable hydraulic cylinder 114. Hydraulic cylinder 114 is in turn actuated by means of a conventional four-way solenoid valve 115 adapted to be connected to a suitable source of hydraulic fluid (not shown) by hydraulic line 116 and having its actuating solenoid coils connected to the control 108 by leads 117. Thus, assuming that pivot pin 67 is inserted in corresponding pivot pin opening 64 in lever member 56, with the other pivot pins 68 and 69 being withdrawn, as shown in FIG. 2, thereby imparting the smallest rotational movement to winding head 22 so that wire dispensing needle 33 traverses slot openings 85 of slots 71c, when the desired number of turns has been wound in the smallest coil 90, turn counter 104 will have its internal contacts closed thereby energizing control 108. Control 108 will in turn through its connection 109 with the brake motor 48 deenergize the motor and energize the brake portion thereof in order immediately to stop the drive shaft 47 and thus to terminate motion of the winding head 22. This stopping of the drive shaft 47 may not, however, be sufficiently accurate properly to position lever member 56 so that pivot pin openings 64, 65 and 66 are in respective alignment with pivot pins 67, 68 and 69. Therefore, energization of control 108 responsive to the signal from turn counter 104 also energizes four-way valve 115 through connection 117 in turn to actuate hydraulic cylinder 114 to force its operating rod 113 downwardly thereby causing roller 112 to cooperate with the heart-shaped cam 110 accurately to position drive shaft 47 and in turn the barrel cam 60 so that lever member 56 is positioned with its pivot pin openings 64, 65 and 66 in accurate alignment with the pivot pins 67, 68 and 69, respectively; the heart-shaped cam arrangement for accurately positioning the drive shaft and the pivoted lever member does not form a part of our present invention, being described and illustrated in co-pending application Serial Number 479,269 of John F. Lill, filed January 3, 1955, and assigned to the assignee of the present application.

It will be readily seen that it is essential that only one of the pivot pins 67, 68 and 69 at any one time be inserted in a corresponding pivot pin opening 64, 65 and 66, and, conversely, that one pivot pin always be inserted in an opening so that the lever member 56 be restrained from falling or otherwise being permanently displaced. For this reason, in order to shift from one predetermined winding head rotation to another, it is highly desirable that one of the pivot pins be withdrawn while another is simultaneously inserted so that at no time will the lever member 56 fail to have a pivot pin inserted in a respective pivot pin opening. In order to provide this operation, each of the pivot pins 67, 68 and 69 has its end removed from the lever member 56 connected to a respective lever member 118, 119 and 120, lever members 118, 119 and 120 having their ends removed from the pivot pins 67, 68 and 69 pivotally connected to a common shaft 122. Each of the pivot pin actuating levers 118, 119 and 120 has a cam follower pin 123 intermediate its ends cooperating with a respective cam 124, 125 and 126, the cams 124, 125 and 126 being mounted on a common shaft 127 and rotated thereby. Cams 124, 125 and 126 are respectively provided with an appropriately configured cam slot 128 which cooperates with the respective cam follower pin 123 of the respective pivot pin actuating lever member 118, 119 and 120 in order to insert or withdraw the respective pivot pin 67, 68 or 69, as the case may be, responsive to the rotational position of the cams 124, 125 and 126. Cams 124, 125, and 126 are in turn rotated by means of a suitable gear 129 on shaft 127 cooperating with a rack 130 actuated by a push rod 131 of a suitable hydraulic cylinder 132; a suitable one-way clutch device 133 is provided connecting shaft 127 to gear 129. It will now be readily comprehended that by virtue of the 120° angular displacement of the cam slots 128 of the cams 124, 125 and 126, rotation of the cams in the direction shown by the arrow 134 by 120° will for example cause lever 118 to withdraw pivot pin 67 while simultaneously causing lever member 119 to insert pivot pin 68 in its respective pivot pin opening 65 in lever member 56, with lever 120 maintaining pivot pin 69 withdrawn from its respective opening 66.

Hydraulic cylinder 132 is in turn actuated by a conventional four-way solenoid valve 135 connected to a suitable source of hydraulic fluid (not shown) by line 137 and having its solenoid operating coils connected to control 108 by lines 137. Thus, when the internal contacts of turn counter 104 are closed responsive to a counting by the turn counter of the predetermined number of turns in one of the coils, for example the smaller coil 90, control 108 energized four-way valve 135 through connection 137 in turn actuating cylinder 132 to push rod 131 in the direction shown by the arrow 138 to rotate cams 124, 125 and 126 in the direction shown by the arrow 134 by 120° thereby to cause lever 118 to withdraw pin 67 while simultaneously causing lever 119 to insert pin 68 with lever 120 maintaining pin 69 in its withdrawn position.

It will now be observed that the levers 118, 119 and 120 are respectively provided with portions 139 cooperating with limit switches 140, 141 and 142 connected respectively to control 108 by lines 144. Limit switches 140, 141 and 142 are appropriately connected in the relay circuitry of control 108 so that after a first pin has been removed and the next successive pin inserted, control 108 will in turn again energize the motor and deenergize the brake of brake-motor 48 and simultaneously actuate valve 115 to in turn actuate cylinder 114 to move rod 113 and roller 112 away from heart-shaped cam 110 thereby initiating operation of the winding mechanism to wind the next coil; control 108 will also energize valve 135 to actuate cylinder 132 to return rod 131 and rack 130 to the position shown in FIG. 2, clutch 133 preventing movement of shaft 127 and cams 124, 125 and 126 during the return stroke of rod 131. It will now be seen that each successive actuation of cylinder 132 will cause rod 131 to rotate the cams another 120° thereby causing withdrawal of one pin and insertion of the next pin. It will readily be apparent that other devices and mechanisms for removing one pivot pin and simultaneously inserting another pivot pin responsive to the completion of a respective one of the concentric coils will occur to those skilled in the art, the above described specific arrangement being intended merely to illustrate the basic principles of our invention.

It will readily be apparent that the specific configuration of our improved winding shroud member will be dependent upon the dimensions of the stator core member and the specific concentric coils to be wound. Referring now to FIGS. 14, 15 and 16, in which like elements are indicated by like reference numerals, there is shown a slightly different configuration for a winding shroud member which has been found to be suitable for a different stator core member and concentric winding configuration. Here, it will be observed that by virtue of the fact that stator core member 144 has a larger diameter than the stator core member 32 of the previous figures, the inner surfaces 83 of enlarged portion 77 of end turn-forming parts 73, 74 are required to be tapered downwardly away from rib 84 rather than being essentially disposed in a common horizontal plane, as is the case of the embodiment of the previous figure (as best seen in FIG. 7). It will further be seen that we have found it desirable to provide rearwardly extending ears 145 at the intersections of the tapered edges 78 and the side edges 79 of enlarged portions 77 of the end turn-forming parts 73, 74. It will further be observed that we have provided a projection 146 extending rearwardly from edge 99 of the outer surface 91 toward stator member 144. The projection 146 and the rearwardly extending ears 145 cooperate to cause the loop of wire 97 which is formed around the outer surface 83 of the enlarged portion 77 to drop off of the enlarged portion 77 on the outer surface 86 of shank portion 76 and the intermediate portion 87 more rearwardly than is the case in the embodiment of FIGS. 7 through 13; this in turn has the tendency to prevent the end turns of the coils from piling up on the forward part of the intermediate portion 87 adjacent the outer surface 91 of the enlarged portion 77. It will be observed that in the embodiment of FIGS. 14, 15 and 16, the two end turn-forming parts 73 and 74 are separable, being held in assembled relation on the core 144 by means of lugs 147 which extend into the bore 72 of stator core member 144 and which are secured together by means of a suitable threaded fastener 148. It will be observed that in common with the embodiment of the previous figures, the shank portion 76 of the embodiments of FIGS. 14, 15 and 16 is narrower than the span or pitch of the smallest coil to be wound, whereas the enlarged portion 77 has a width adjacent its inner end generally coextensive with the span or pitch of the largest coil to be wound. It will also be observed that again the inner edges 92 of the inner surfaces 83 of the enlarged portion 77 are in general axial alignment with the neck portions 85 of windings 71c in which the smallest span coil is wound whereas the side edges 79 at their widest point, i.e., at ears 145, are generally in axial alignment with the bottoms 93 of the slots 71a in which the largest span coil is wound so that the inner surfaces 83 of enlarged portions 77 taper outwardly away from the bore 72 of the stator core member 144.

Turning now to FIGS. 17, 18 and 19, we have shown another shroud member in accordance with my invention proportioned for winding two concentric coils in a stator core member 150. Here, it will be observed that the smaller span coil is to be wound in slots 151a whereas the larger span coil is to be wound in slots 151b. It will again be observed in common with the improved winding shrouds of the previous figures of this application, that the shank portion 76 is narrower than the pitch of the smallest coil to be wound, i.e., in the slots 151a whereas the enlarged portion 77 has an extreme width generally coextensive with the pitch of the larger coil to be wound, i.e., in the slots 151b. Again, the inner edges 78 of the enlarged portion 77 taper outwardly and forwardly from the shank portion 76 with the inner edge 92 of inner surfaces 83 being generally in axial alignment with the neck portions 85 of the slots 151a of the smaller coil to be wound and with the side edges 79 at their widest point, i.e., at their junction with the tapered edges 78, being in general axial alignment with the bottoms 93 of the slots 151b in which the larger coil is wound. It is thus seen in FIG. 17 that the inner surfaces 83 again are slanted or tapered outwardly from rib 84 in order to provide the requisite taper with respect to the bore 72 of the stator core member 150. In common with the other embodiment of my improved shroud member, the outer surface 86 of the enlarged portion 77 is generally curved in cross-section, as is the outer surface of the intermediate area 87 and the outer surface 86 of the shank portion 76.

It will readily be apparent to those skilled in the art that the overall axial length of the end turn-forming parts 73, 74 together with the width of the enlarged portions 77 at their widest point is determined by the span of the end turns of the largest coil to be wound. Thus, in an actual shroud member in accordance with our invention of the general type shown in FIGS. 7 through 13 for winding a slot stator core member having an outside diameter of six (6) inches, and a bore diameter of three and three-quarters (3¾) inches, the winding consisting of four pole groups each having three concentric coils with each smaller coil having twenty-three (23) turns, each intermediate coil thirty-one (31) turns, and each larger coil thirty-six (36) turns, the end turn-forming parts respectively had an overall length of three and one-half (3½) inches with the overall width of each enlarged portion 77 at its widest point being three (3) inches, the width of each shank portion being one and one-quarter (1¼) inches, and the length of each shank portion being three-eighths (⅜) inch.

It will now be seen that we have provided an improved gun-type stator winding machine and also an improved winding shroud member for use therewith which, for the first time to the best of the present applicants' knowledge, permits the winding of a plurality of concentrically disposed coils of a distributed winding with a gun-type winding machine employing only one winding shroud member for all coils of each pole group. It can further be observed that our improved winding shroud member not only permits the consecutive winding of a plurality of concentrically disposed coils, but also forms the coils away from the bore of the stator core member and also forces the turns of the coils, particularly the largest span coils, radially outwardly in the slots thereby permitting winding of a greater number of turns in the slots and thus in turn permitting greater slot fullness.

While FIG. 1 illustrates a stator winding machine in accordance with our invention in which all pole groups of a stator are simultaneously wound with no indexing of the stator being necessary during winding, it will be appreciated that this requires the making of connections between the pole groups. Our invention, however, is equally applicable to the winding of only a single pole group at one time, or, for example, to the simultaneous winding of two pole groups of a four pole stator or three pole groups of a six pole stator with the stator then being indexed to wind the remaining pole groups; this may in some instances be found to be the most economical procedure by virtue of the reduction of the number of inter-pole connections required.

While we have illustrated and described specific embodiments of our invention, further modifications and improvements will occur to those skilled in the art and we desire therefore in the appended claims to cover all modifications which do not depart from the spirit and scope of our invention.

What is claimed is:

1. A shroud member for a stator winding machine for winding at least two concentric coils of different pitch for a distributed winding into an internally slotted stator core member, said shroud member being adapted to be secured to said stator and having two end turn-forming parts respectively extending axially outwardly from each end thereof, each of said parts having a shank portion adjacent said stator having a width less than the pitch of the smaller of said coils and an enlarged portion spaced from said stator having one end joined to said shank portion, each of said enlarged portions having a width adjacent its one end generally corresponding to the pitch of the larger of said coils, the edges of said one end of each of said enlarged portions respectively tapering outwardly and forwardly from the sides of the respective shank portion.

2. A shroud member for a stator winding machine for winding at least two concentric coils of different pitch for a distributed winding into an internally slotted stator core member, said shroud member being adapted to be secured to said stator and having two end turn-forming parts respectively extending axially outwardly from each end thereof, each of said parts having a shank portion adjacent said stator having a width less than the pitch of the smaller of said coils and an enlarged portion spaced from said stator and having one end joined to said shank portion, each of said shank portions having its outer surface generally outwardly curved, each of said enlarged portions having a width adjacent its one end generally corresponding to the pitch of the larger of said coils, the edges of said one end of each of said enlarged portions respectively tapering outwardly and forwardly from the sides of the respective shank portion, the sides of each of said enlarged portions merging respectively from the outer extremities of said tapered edges generally to a point at its outer end, each of said enlarged portions having at least a portion of its outer surface generally outwardly curved and tapering smoothly to its outer end.

3. A shroud member for a stator winding machine for winding at least two concentric coils of different pitch for a distributed winding into an internally slotted stator core member, said shroud member being adapted to be secured to said stator and having two end turn-forming parts respectively extending axially outwardly from each end thereof, each of said parts having a shank portion adjacent said stator having a width less than the pitch of the smaller of said coils and an enlarged portion spaced from said stator and having one end joined to said shank portion, each of said shank portions having its outer surface generally outwardly curved, each of said enlarged portions having a width adjacent said one end generally corresponding to the pitch of the larger of said coils, the edges of said one end of each of said enlarged portions respectively tapering outwardly and forwardly from the sides of the respective shank portion, the sides of each of said enlarged portions merging respectively from the outer extremities of said tapered edges generally to a point at its outer end, each of said enlarged portions having a first portion of its outer surface generally outwardly curved and tapering smoothly to its outer end and a second portion of its outer surface intermediate its first portion and the respective shank portion generally outwardly curved and tapering smoothly to a junction with the outer surface of the respective shank portion, said outer end of each of said enlarged portions being above the inner surface thereof.

4. A shroud member for a gun-type stator winding machine for winding at least two concentric coils of different pitch for a distributed winding into an internally slotted stator core member, said shroud member comprising two end turn-forming parts and means for securing said shroud member to said stator with said parts respectively extending axially outwardly from each end thereof, each of said parts having a shank portion adjacent the respective stator end having a width less than the pitch of the smaller of said coils and an enlarged portion spaced from said stator and having one end joined to said shank portion, each of said enlarged portions having a width adjacent said one end generally corresponding to the pitch of the larger of said coils and having its sides merging generally to a point at its outer end.

5. A shroud member for a gun-type stator winding machine for winding at least two concentric coils of different pitch for a distributed winding into an internally slotted stator core member, said shroud member being adapted to be secured to said stator and having two end turn-forming parts respectively extending axially outwardly from each end thereof, each of said parts having a shank portion adjacent said stator having a width less than the pitch of the smaller of said coils and an enlarged portion spaced from said stator and having one end joined to said shank portion, each of said enlarged portions having a width adjacent its one end generally corresponding to the pitch of the larger of said coils, the edges of said one end of each of said enlarged portions respectively tapering outwardly and forwardly from the sides of the respective shank portion, the sides of each of said enlarged portions merging respectively from the outer extremities of said edges of its one end generally to a point at its outer end.

6. A shroud member for a gun-type stator winding machine for winding at least two concentric coils of different pitch for a distributed winding into an internally slotted stator core member, said shroud member being adapted to be secured to said stator and having two end turn-forming parts respectively extending axially outwardly from each end thereof, each of said parts having a shank portion adjacent said stator having a width less than the pitch of the smaller of said coils and an enlarged portion spaced from said stator and having one end joined to said shank portion, each of said shank portions having its outer surface generally outwardly curved, each of said enlarged portions having a width adjacent its one end generally corresponding to the pitch of the larger of said coils, the edges of said one end of each of said enlarged portions respectively tapering outwardly and forwardly from the sides of the respctive shank portion, each of said enlarged portions having at least a portion of its outer surface generally outwardly curved and tapering smoothly to its outer end.

7. A shroud member for a gun-type stator winding machine for winding at least two concentric coils of different pitch for a distributed winding into an internally slotted stator core member, said shroud member being adapted to be secured to said stator and having two end turn-forming parts respectively extending axially outwardly from each end thereof, each of said parts having a shank portion adjacent said stator having a width less than the pitch of the smaller of said coils and an enlarged portion spaced from said stator and having one end joined to said shank portion, each of said shank portions having its outer surface generally outwardly curved, each of said enlarged portions having a width adjacent its one end generally corresponding to the pitch of the larger of said coils, the edges of said one end of each of said enlarged portions respectively tapering outwardly and forwardly from the sides of the respective shank portion, each of said enlarged portions having at least a portion of its outer surface generally outwardly curved and tapering smoothly to its outer end, the inner surfaces of each of said enlarged portions respectively tapering outwardly away from the bore of said stator member.

8. The shroud member of claim 3 in which each of said enlarged portions has a pair of rearwardly extending ears respectively formed at the junctions of its tapered edges and its sides.

9. The shroud member of claim 3 in which each of said enlarged portions has a projection extending rearwardly from the inner edge of its first outer surface portion and overlaying its second outer surface portion.

10. In combination: an internally slotted stator core member; and a shroud member for winding at least two concentric coils of different pitch into the slots of said core member, said shroud member being secured to said core member and having two end turn-forming parts respectively extending axially outwardly from each end thereof; each of said parts having a shank portion adjacent the respective core member end having a width less than the span between the slots in which the smaller of the coils is wound, each of said parts having an enlarged portion spaced axially outwardly from said core member and having one end joined to said shank portion, each of said enlarged portions having a width adjacent its one end generally the same as the span between the slots in which the larger of the coils is wound.

11. In combination: an internally slotted stator core member; and a shroud member for winding at least two concentric coils of different pitch into the slots of said core member, said shroud member being secured to said core member and having two end turn-forming parts respectively extending axially outwardly from each end thereof, each of said parts having a shank portion adjacent the respective core member end and having a width less than the span between the openings of the slots in which the smaller of the coils is wound, each of said shank portions having its outer surface generally outwardly curved, each of said parts having an enlarged portion spaced axially outwardly from said core member and having an outer end and an inner end joined to said shank portion, said inner end of each of said enlarged portions having edges respectively tapering forwardly toward the outer end thereof and outwardly away from the sides of the respective shank portions, said edges having outer extremities which join the sides of the respective enlarged portion, the sides of each of said enlarged portions merging respectively from said outer extremities of said edges generally to a point at said outer end, said outer extremities of said edges of each of said enlarged portions being in general axial alignment respectively with the bottoms of the slots in which the larger of the coils is wound and the inner ends of said edges of each of said enlarged portions adjacent their junctions with the sides of the respective shank portion being in general axial alignment respectively with the openings of the slots in which the smaller of the coils is wound whereby the inner surfaces of the said enlarged portions taper respectively outwardly away from the bore of the said core member, each of said enlarged portions having at least a portion of its outer surface generally outwardly curved and tapering smoothly to its outer end.

12. The combination of claim 11 wherein said outer end of each of said enlarged portions is spaced radially outwardly from the axial center line of the bore of said core member by a distance no greater than the radius of the bore.

13. The combination of claim 11 wherein each of said enlarged portions has a first portion of its outer surface generally outwardly curved and tapering smoothly to its outer end, said first portion of said outer surface of each of said enlarged portions adjacent the respective one end extending radially outward farther than the radial extent of said stator slots, wherein said outer surface of each of said shank portions has a smaller radial extent than said stator slots, and wherein each of said enlarged portions has a second portion of its outer surface intermediate its first portion and the respective shank portion generally outwardly curved and tapering smoothly to a junction with the outer surface of the respective shank portion.

References Cited in the file of this patent

UNITED STATES PATENTS

| | | |
|---|---|---|
| 1,371,647 | Sandell | Mar. 15, 1921 |
| 1,612,026 | Jannell | Dec. 28, 1926 |
| 2,578,495 | Wirth | Dec. 11, 1951 |
| 2,847,170 | Lill et al. | Aug. 12, 1958 |